US008959776B2

(12) United States Patent
Shipp et al.

(10) Patent No.: US 8,959,776 B2
(45) Date of Patent: Feb. 24, 2015

(54) KNIFE SAFETY APPARATUS

(76) Inventors: Jennifer Shipp, Mission, TX (US); Samuel Shipp, Mission, TX (US)

( * ) Notice: Subject to any disclaimer, the term of this patent is extended or adjusted under 35 U.S.C. 154(b) by 657 days.

(21) Appl. No.: 13/237,858

(22) Filed: Sep. 20, 2011

(65) Prior Publication Data

US 2012/0240411 A1 Sep. 27, 2012

Related U.S. Application Data

(60) Provisional application No. 61/384,529, filed on Sep. 20, 2010.

(51) Int. Cl.
*A47J 43/18* (2006.01)
*B26B 29/06* (2006.01)

(52) U.S. Cl.
CPC .................................... *B26B 29/063* (2013.01)
USPC .............. 30/124; 30/286; 30/295; 269/289 R; 269/302.1

(58) Field of Classification Search
CPC ........................................................ A47J 43/18
USPC ........... 30/123, 124, 142, 282, 286, 288, 289, 30/291, 295; 83/451, 454, 455, 452, 83/761–763, 765, 459, 732, 932; D7/672–674, 683, 686, 698; D29/114; 269/289 R, 302.1
See application file for complete search history.

(56) References Cited

U.S. PATENT DOCUMENTS

| | | | | | |
|---|---|---|---|---|---|
| 1,184,710 | A | * | 5/1916 | Baumann | 30/295 |
| 1,591,119 | A | * | 7/1926 | Fulton | D7/698 |
| 1,643,708 | A | * | 9/1927 | Engert | 30/148 |
| 1,928,126 | A | * | 9/1933 | Fried | 269/289 R |
| 2,057,250 | A | * | 10/1936 | Sanger | 30/289 |
| D117,904 | S | * | 12/1939 | Kormendy | D7/669 |
| 2,277,888 | A | * | 3/1942 | Segal | 33/525 |
| D149,961 | S | * | 6/1948 | Mason | D7/683 |
| 2,496,062 | A | * | 1/1950 | Morfesi | 30/299 |
| 2,652,087 | A | * | 9/1953 | Turpin | 83/762 |
| D170,912 | S | * | 11/1953 | Collins et al. | D7/673 |
| 2,925,110 | A | * | 2/1960 | Bayers | 30/289 |
| 3,319,682 | A | * | 5/1967 | Hall | D7/673 |
| 3,566,424 | A | * | 3/1971 | Burbig | 30/169 |
| 3,975,043 | A | * | 8/1976 | Miles | 294/25 |
| 4,094,221 | A | * | 6/1978 | Jacoby | 83/762 |
| D258,634 | S | * | 3/1981 | Adams | D7/683 |
| 4,341,376 | A | * | 7/1982 | Germinario | D7/673 |
| D267,143 | S | * | 12/1982 | Gessing et al. | D7/411 |
| 4,447,051 | A | * | 5/1984 | Price | 269/302.1 |
| 4,507,804 | A | * | 4/1985 | Consigny | 2/21 |
| 4,756,519 | A | * | 7/1988 | Lilja | 269/302.1 |
| D348,591 | S | * | 7/1994 | Willis | D7/698 |
| D351,257 | S | * | 10/1994 | Roberts et al. | D29/113 |
| 5,481,953 | A | * | 1/1996 | McLeod | 83/932 |
| D379,574 | S | * | 6/1997 | Jeppesen et al. | D7/698 |

(Continued)

*Primary Examiner* — Jason Daniel Prone
(74) *Attorney, Agent, or Firm* — M. Susan Spiering; Ferrells, PLLC

(57) ABSTRACT

A knife safety apparatus that is used to protect the fingers from being cut while cutting and chopping the food items is disclosed. The knife safety apparatus includes a food holding body and a handle connected to the food holding body. The food holding body helps to hold the food firmly with the help of its bottom sidewall. The handle has a gripping surface which helps to hold the knife safety apparatus. The apparatus has a knife guiding slit which acts as a knife receiving and knife cleaning space. The apparatus is helpful to cut, chop, and mince a food item irrespective of its size and shape.

9 Claims, 3 Drawing Sheets

(56) References Cited

U.S. PATENT DOCUMENTS

| | | | | | |
|---|---|---|---|---|---|
| D383,042 | S | * | 9/1997 | Lach | D7/698 |
| 5,711,027 | A | * | 1/1998 | Katz et al. | 2/21 |
| D391,029 | S | * | 2/1998 | Katz et al. | D29/113 |
| 5,899,444 | A | * | 5/1999 | Rempe | 269/289 R |
| 5,927,701 | A | * | 7/1999 | Chapman | 269/87.2 |
| D418,258 | S | * | 12/1999 | Moro | D29/114 |
| 6,389,944 | B1 | * | 5/2002 | Davidson | D7/673 |
| 6,564,685 | B1 | * | 5/2003 | Beaton | 30/123 |
| 6,729,510 | B1 | * | 5/2004 | Romanov | 2/21 |
| 6,805,031 | B1 | * | 10/2004 | Stallato | 83/452 |
| 7,024,979 | B1 | * | 4/2006 | Lundin | 30/124 |
| D553,804 | S | * | 10/2007 | Kaposi | D29/114 |
| D558,540 | S | * | 1/2008 | White et al. | D29/114 |
| D577,155 | S | * | 9/2008 | Hauser | D29/114 |
| 7,421,787 | B2 | * | 9/2008 | White et al. | 30/123 |
| D588,879 | S | * | 3/2009 | Brett | D7/698 |
| D611,315 | S | * | 3/2010 | Keller | D7/698 |
| 7,743,690 | B2 | * | 6/2010 | White et al. | 30/291 |
| 7,874,549 | B2 | * | 1/2011 | DiNatale | 269/289 R |
| 7,878,493 | B2 | * | 2/2011 | Shamoon | 269/289 R |
| D651,356 | S | * | 12/2011 | Logan et al. | D29/114 |
| D651,357 | S | * | 12/2011 | Logan | D29/114 |
| D654,333 | S | * | 2/2012 | Aguirre | D7/698 |
| D657,095 | S | * | 4/2012 | Logan | D29/114 |
| 8,241,688 | B2 | * | 8/2012 | Aguirre | 426/518 |
| 8,381,313 | B2 | * | 2/2013 | Logan | 2/21 |
| D678,010 | S | * | 3/2013 | Sudmalis | D7/698 |
| 8,430,387 | B2 | * | 4/2013 | Roser | 269/302.1 |
| D685,617 | S | * | 7/2013 | Zemel et al. | D7/683 |
| D712,708 | S | * | 9/2014 | High | D7/683 |
| 2002/0194738 | A1 | * | 12/2002 | Francisco | 30/289 |
| 2005/0150029 | A1 | * | 7/2005 | Votolato | 2/16 |

* cited by examiner

KNIFE SAFETY APPARATUS

CROSS-REFERENCES TO RELATED APPLICATIONS

This original non-provisional application claims benefit of and priority to U.S. Provisional Application Ser. No. 61/384,529, filed Sep. 20, 2010 and entitled "Knife Safety Apparatus," which is incorporated by reference herein.

STATEMENT REGARDING FEDERALLY SPONSORED RESEARCH OR DEVELOPMENT

Not applicable.

BACKGROUND OF THE INVENTION

Field of the Invention

The present invention relates to cooking. More specifically, the present invention is an apparatus for protecting a user when wielding a cooking knife for chopping food items.

BRIEF SUMMARY OF THE INVENTION

The present invention provides a novel apparatus that holds food in place while cutting and chopping; protects fingers from being cut while chopping food; removes excess pieces of food stuck to sides of knife after chopping food; and reduces time handling sharp knives during the food handling process. The invention comprises a food holding body having a cutting face, a handle face, and a sidewall between the handle face and the cutting face, a section of the sidewall defining a knife guiding slit adjacent extending through the body between the handle face and the cutting face; and a handle having a gripping surface, a first end attached to the food holding body and a second end distal from the food holding body, the handle extending from the handle face and defining a knife-receiving space adjacent to at least part of the knife guiding slit and at least part of the handle face.

DETAILED DESCRIPTION OF THE INVENTION

Figure 1:
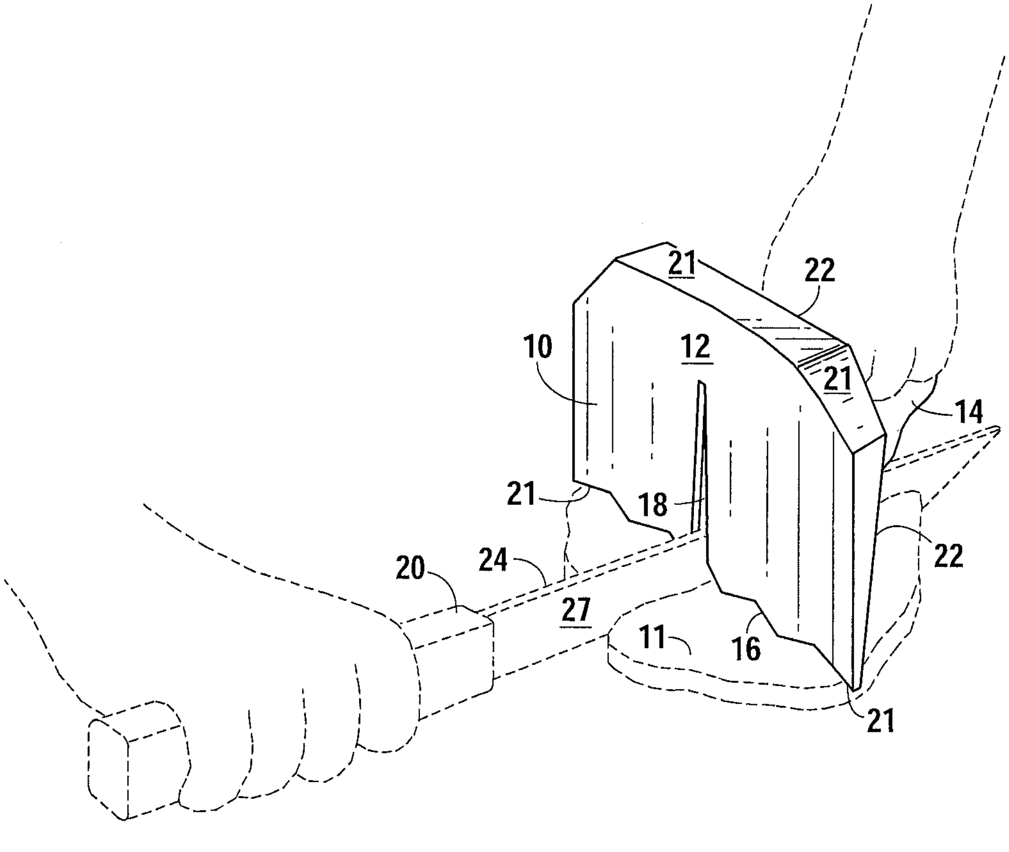
FIG. 1 is a perspective view of a knife safety apparatus of the present invention with a knife inserted therein and a food item thereunder.
Figure 2:
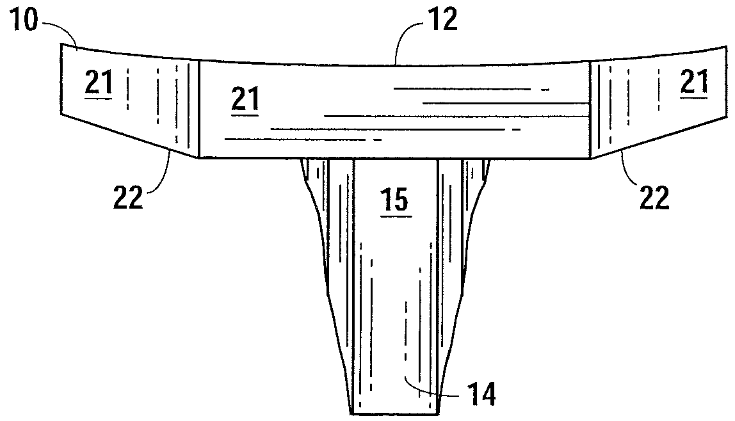
FIG. 2 is a top view of the preferred knife safety apparatus of the present invention.
Figure 3:
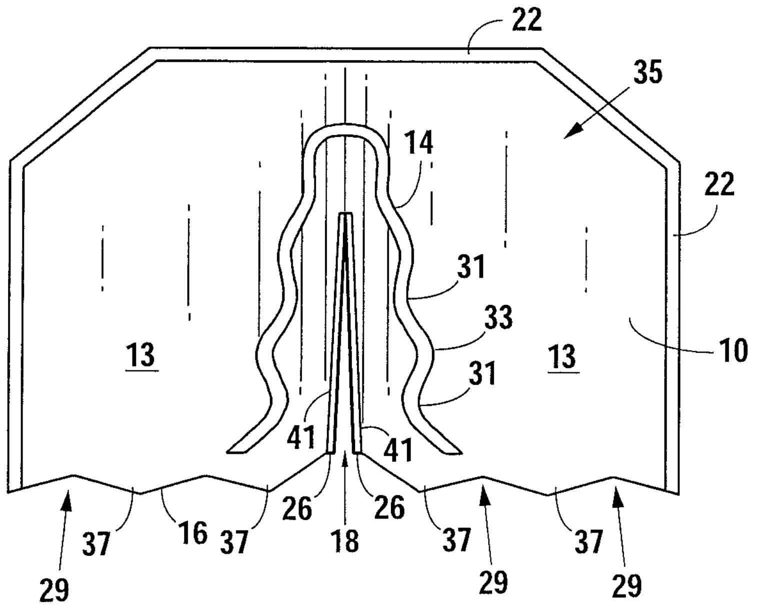
FIG. 3 is a rear view of the preferred knife safety apparatus of the present invention.
Figure 4:
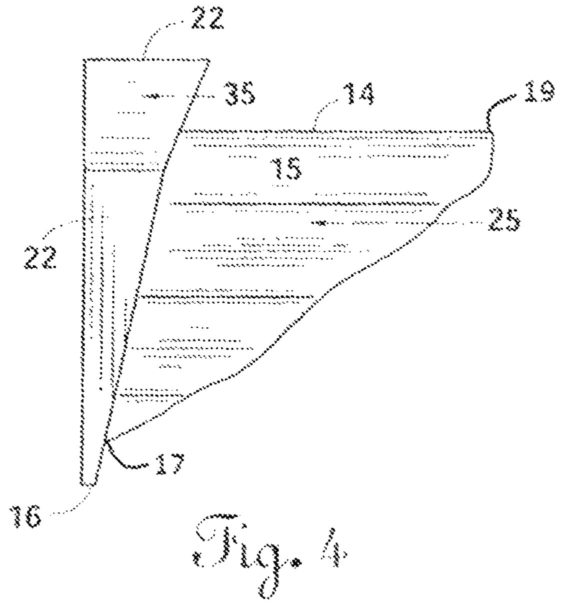
FIG. 4 is a side view of the preferred knife safety apparatus of the present invention.

The present invention is a knife safety apparatus and cutting methods that will help cooks around the world cut and chop food safer than current devices and/or methods. The knife safety apparatus is a tool with a unique design that has several different functions. Primarily, it protects fingers while chopping and cutting food because it eliminates the users contact with the knife blade.

FIGS. 1-4 show the preferred embodiment of the invention. The knife safety apparatus has a food holder (or food holding body) 10 with a cutting face 12 on one side and an opposing handle face 13. A sidewall 21 separates the cutting face 12 from the handle face 13. Opposite the cutting face 12, a handle 14 having a gripping surface 15, a first end 17 attached to the food holding body 10, and a distal end 19 protrudes from the food holder 10. The sidewall 21 comprises a bottom edge 16 along its perimeter and extending from the bottom edge 16 into the food holder 10 is a knife guiding slit 18. The handle 14 defines a knife-receiving space 25 adjacent to the knife guiding slit 18 and at least part of the handle face 13.

As mentioned, the primary purpose of the knife safety apparatus is to protect a user who is using a knife to cut and/or chop food. As shown in FIG. 1, a user holds the knife safety apparatus with the handle 14. The bottom edge 16 can be pressed against food items to hold a food item 11 in place while cutting. Is this regard, a knife blade 24 of a knife 20 passes through the knife guiding slit 18 while the bottom edge 16 holds the food item in place. Alternatively, the user may slide the knife 20 along the cutting face 12 of the food holder 10 so that the wide side 27 of the knife blade 24 slides along the cutting face 12.

The bottom edge 16 can be flat, serrated, toothed, or otherwise adapted to hold whatever type of food is being cut. For example, the pictures show a bottom edge 16 that is serrated with large grooves 29 defined by the adjacent serrations 37. Large food items such as potatoes and leeks partially fit within the large grooves 29 and the large groove 29 helps hold these items in place while the knife blade 24 is run through the knife guiding slit 18 to slice items. As another example, the bottom edge 16 could be toothed so that the teeth along the bottom edge 18 poke into a piece of food 11. Moreover, bottom edge 16 could be sharp and the knife safety apparatus could be used for chopping and/or mincing.

As mentioned, the handle 14 extends from the food holder 10 from the handle surface 13 of the food holder 10 opposite the cutting face 12. Preferably, the handle 14 extends from the food holder 10 over and around the knife guiding slit 18 in the food holder 10 forming a knife-receiving space 25; however, handle 14 could extend from the food holder 10 in other areas. In the preferred embodiment, the user's hand wraps around the gripping surface 15 of the knife guiding slit 18 such that the palm of the user's thumb is on one side of the knife guiding slit 18 and the user's fingers are on the other side of the knife guiding slit 18. Preferably, the handle 14 is contoured and is universal so it can be held by both right-handed and left-handed users. The gripping surface 15 comprises alternative convex sections 31 and concave sections 33 to facilitate maintaining a solid grip on the apparatus.

The food holder 10 also preferably features a guard 22 extending along both the top end and both sides of the food holder 10 to protect fingers even when the wide side 27 of the knife blade 24 is positioned planar to the cutting face 12. The guard defines a guard space 35 between a portion of the gripping surface 15 and the handle face 13.

A wide side 27 of the knife blade 24 can be positioned planar to the cutting face 12 to chop items. In this regard, the cutting face 12 is positioned adjacent to the food item 11 and the knife blade 24 is moved up and down in a chopping motion along the cutting face 12. If desired, the user can press a wide side 27 of the knife blade 24 against the cutting face 12 during the chopping. The guard 22 protects the user's hand, which would be at least partially occupying the guard space 35, if the knife blade 24 inadvertently comes down on the handle side of the food holding member 10.

After chopping meats, fruits, and vegetables excess food is commonly stuck to the sides of the knife blade 24. The knife safety apparatus keeps the user from having to touch the knife blade 24 with his/her bare hand and eliminates the chances of being cut while attempting to wipe excess food off of the blade. To remove food stuck to the knife blade 24, a user positions the knife guiding slit 18 of the knife safety apparatus over the knife blade 24 at the handle end of the knife blade 24. The user moves the knife blade 24 through the knife guiding slit 18 toward the handle side of the knife safety apparatus (i.e., into the knife-receiving space 25) by moving the knife safety apparatus and holding the knife 20 static, by moving the knife 20 and holding the knife safety apparatus static, or by moving both. Knife guide sidewalls 41 of the knife guiding slit 18 remove the food which is stuck to the knife blade 24. The removed food falls to the cutting surface below and in front of the cutting face 12 of the knife safety apparatus. Preferably, the knife guide sidewalls 41 of the knife guiding slit 18 have a flexible material 26 attached thereto, which helps scrape the food from the knife blade 24.

The knife safety apparatus is also perfect for pushing chopped food from the cutting surface into bowls, pots, pans, and other vessels. After cutting the food, the user puts the knife 20 down and uses the knife safety apparatus to scoop food from the cutting surface to the desired carrying vessel. The user pushes the cutting face 12 of the knife safety apparatus to the food on the cutting surface and with its free hand the user holds the food against the cutting face 12. The user then lifts the food and the knife safety apparatus to the vessel and deposits the food by removing his/her free hand from the food. Alternatively, the user can use the cutting face 12 to push the food from the cutting surface into the vessel or could even uses the handle face 13 to pull the food into the cooking vessel. By using this technique, the user further reduces the chance of being cut by the knife 20. Additionally, the knife blade 24 remains sharp and ready for more cutting, thus saving the time and money associated with sharpening.

The apparatus is preferably made out of one solid piece of hard, durable plastic except for the flexible material 26, which is preferably made of rubber. In addition, the knife safety apparatus is preferably made of dishwasher-safe materials and as many corners as possible are rounded to eliminate sharp edges.

The present invention is described in terms of preferred embodiment in which a specific apparatus described. Those skilled in the art will recognize that alternative embodiments of such an apparatus can be used in carrying out the present invention. Other aspects and advantages of the present invention may be obtained from a study of this disclosure and the drawings, along with the appended claims.

We claim:

1. A knife safety apparatus comprising:

a food holding body, comprising:
- a cutting face;
- a handle face;

a sidewall between the handle and cutting faces, wherein the sidewall includes a bottom sidewall having an edge configured to grip a food item; and
- a knife guiding slit extending from the cutting face to the handle face; and a handle, comprising:

a first end attached to the food holding body at the handle face around the knife gliding slit; and a second end that is distal from the first end, wherein the first and second ends define a gripping surface therebetween, such that a knife receiving space is formed by the gripping surface, and wherein:

in a first configuration, a knife is received by the knife gliding slit and the knife receiving space in a first direction, for cutting the food item; and in a second configuration, the knife is positioned planar to the cutting surface in a second direction orthogonal to the first direction, for chopping the food item.

2. The knife safety apparatus of claim 1 further includes a flexible material attached to the knife guiding slit for cleaning the knife received in the knife gliding slit.

3. The knife safety apparatus of claim 1, wherein the sidewall further includes a top sidewall having a guard extending therefrom to define a guard space between the handle face and a portion of the gripping surface.

4. The knife safety apparatus of claim 1, wherein the gripping surface comprises a plurality of alternating convex and concave curves.

5. The knife safety apparatus of claim 1, wherein the apparatus is made of one solid piece of plastic.

6. The knife safety apparatus of claim 1, wherein the apparatus is made up of plastic.

7. The knife safety apparatus of claim 1, wherein the bottom sidewall comprises a serrated edge configured to grip a food item.

8. The knife safety apparatus of claim 1, wherein the bottom sidewall comprises a plurality of teeth extending from the food holding body.

9. The knife safety apparatus of claim 1, wherein a portion of the sidewall is sharpened to a cutting edge.

* * * * *